Jan. 19, 1965     T. E. MEAD     3,165,770
TAPPING DRILL PRESS WITH INDEPENDENT
MOTOR FOR REVERSING SPINDLE
Filed Jan. 15, 1963     2 Sheets-Sheet 1
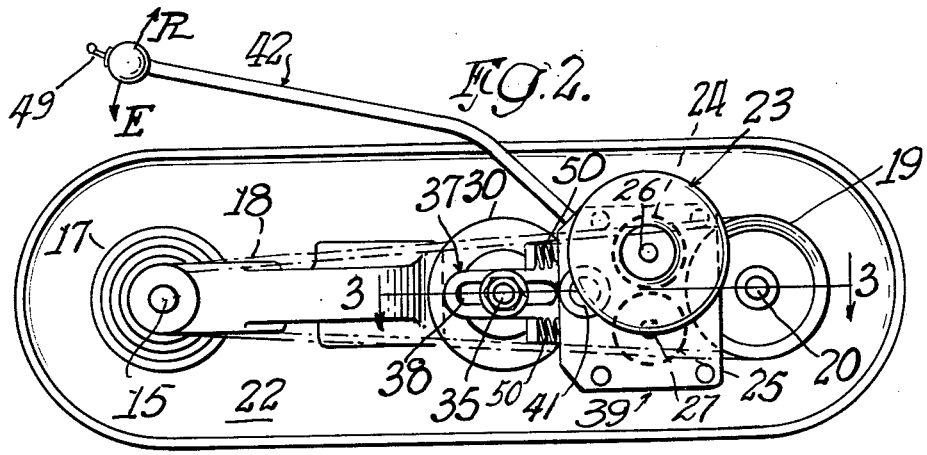
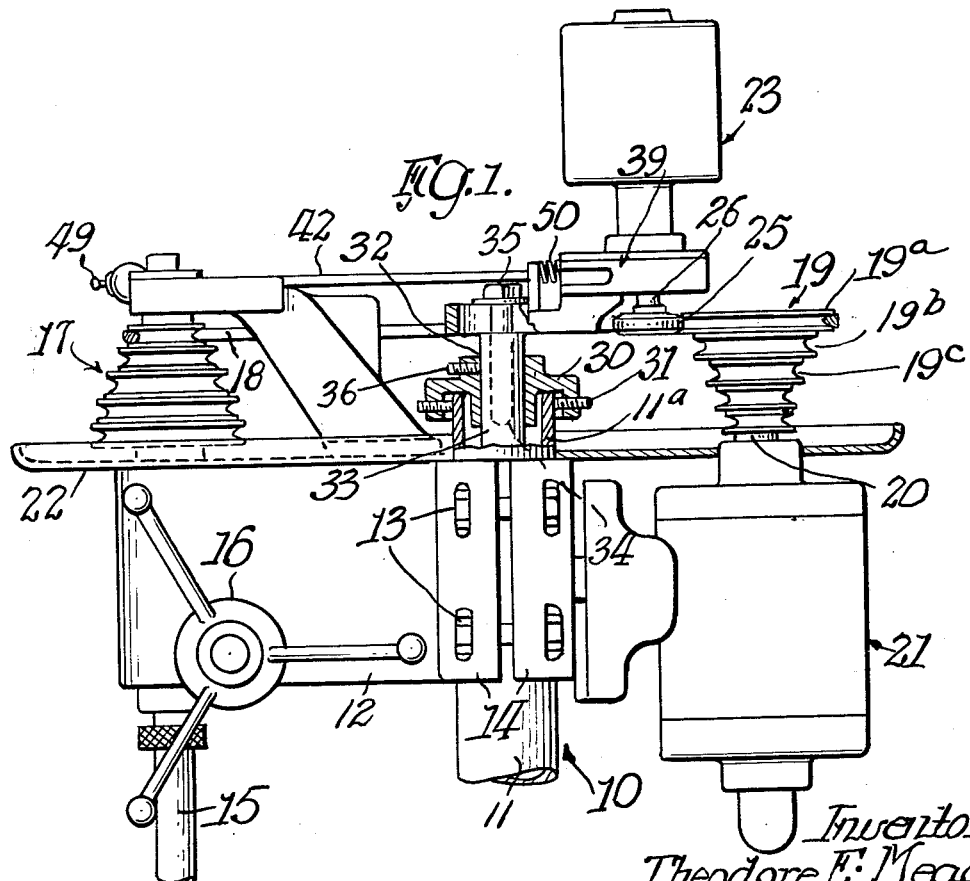
Inventor
Theodore E. Mead
by Dawson, Tilton, Fallon
Lungmus & Alexander Attys

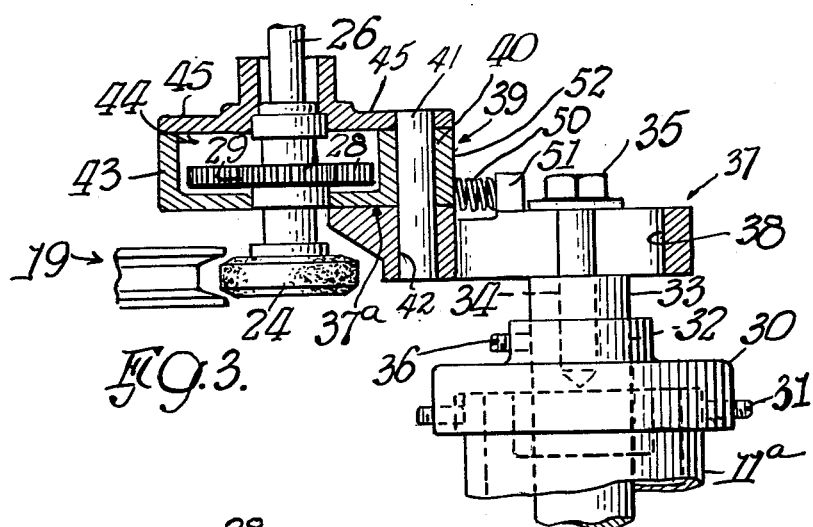

United States Patent Office 3,165,770
Patented Jan. 19, 1965

3,165,770
TAPPING DRILL PRESS WITH INDEPENDENT MOTOR FOR REVERSING SPINDLE
Theodore E. Mead, 1020 Michigan Ave., Wilmette, Ill.
Filed Jan. 15, 1963, Ser. No. 251,654
11 Claims. (Cl. 10—138)

This invention relates to a tapping drill press, and, more particularly, to a power attachment for a drill press which adapts the spindle to perform a tapping operation without the need of extensive set-up.

One of the most tiresome and time-wasting operations in the manufacturing process is tapping holes by hand. On the average, it takes ten to twenty times as long to tap threads in a hole as it does to drill the hole, and, when tapped free hand, the threads are often not in perfect alignment with the hole. This may cause bad assembly characteristics in the component parts of the fixture, or, worse still, may cause the tap to break in the hole, which often destroys the usefulness of the whole piece of work.

It is, therefore, an object of the invention to provide an attachment device for a drill press which does not interfere in any way with the normal operation of the drill press yet is available for instant use as soon as the hole has been drilled, or, if preferred, a series of holes of the same size can be drilled in the work and then all tapped in a subsequent operation.

Another object of the invention is to provide a combination drill press and tapping device wherein a conventional drill press is provided with a unique and semi-permanently affixed tapping attachment and wherein either device may be used on the same work and without special clamping. Here, it will be appreciated that most tapping attachments which are used in conjunction with a drill press are permanently affixed to the drill press so as to make it inconvenient to use the machine as a drill press. Therefore, normally two drill presses would be required where power tapping is to be done, the first one being used for drilling holes and the second one for tapping. Even ignoring the added expense of having two machines to do this simple operation, there is the added factor of time lost in making two setups in order to tap one hole. The first setup is made in the drill press for the purpose of drilling the hole, and in such cases a careful and skilled operator will always clamp the workpiece to the drill press table so that it cannot move during the drilling operation. It is even more essential to clamp the workpiece to the machine table during a tapping operation because of the much higher torque involved. Some work pieces of irregular shape are rather difficult to clamp in position, and, once clamped, it is desirable to complete the operation before the workpiece is again removed.

Still another object of the invention is to provide a novel tapping attachment for mounting on a drill press so as to independently operate the power train to the drill press spindle and wherein different speeds of spindle rotation are provided for the entry and removal of the tap.

A further object of the invention is to provide a novel power transmission apparatus useful, in one embodiment, in connection with a tapping attachment but which possesses advantages for many applications. A further object is to provide in the apparatus just described a novel gear providing part of a transmission system. Other objects and advantages of the invention may be seen in the details of construction and operation set down in this specification.

The invention will be explained in conjunction with an illustrative embodiment in the accompanying drawing, in which—

FIG. 1 is a fragmentary side elevational view of a drill press equipped with the inventive attachment;

FIG 2 is a top plan view of the apparatus seen in FIG. 1;

FIG. 3 is a vertical sectional view through the upper portion of the apparatus seen in FIG. 1 and as would be seen along the sight line 3—3 as applied to FIG. 2;

FIG. 4 is a plan view, partially in section and on enlarged scale, of the showing in FIG. 2;

FIG. 5 is a fragmentary sectional view taken along the sight line 5—5 of FIG. 4; and FIG. 6 is a fragmentary plan elevational view showing different positions of the operative elements of the attachment in engagement with the power train of a drill press.

In the illustration given and with reference to FIG. 1, the numeral 10 designates generally a drill press, which is seen in fragmentary form, the numeral 11 designating the drill press column which is vertically oriented and which positionably carries a head 12. In accordance with conventional usage, the head is clamped to the column 11 as by bolts 13 extending through flanges 14 provided as part of the head.

Reciprocably mounted in the head 12 is the spindle 15, suitably actuated by means of a hand wheel 16. The spindle 15 carries a multiple grooved V-belt sheave or pulley 17 at its upper end, in which is entrained a V-belt 18. The belt 18 is also entrained in one of the grooves of a second multi-grooved sheave 19 carried on the shaft 20 of the drill drive motor 21. The drive motor 21 is suitably carried by the head 12, and the belt and pulley components 17–19 making up the power train are suitably protected above the head by means of a pan 22.

Thus far, the apparatus described is of conventional construction and the showing and description are given merely for the sake of illustrating the environment of the invention.

Tapping attachment

The inventive attachment includes a supplemental tapping motor 23 (seen only in FIGS 1 and 2) which delivers power to a pair of friction wheels 24 and 25. As can be best seen in FIG. 6, the wheels 24 and 25 are pivotable into selective engagement with the drill motor pulley 19, the wheel 25 being employed during entry of the tap into a drill hole, while the wheel 24 is driven faster and is employed for removal of the tap. For this purpose, the wheel 24 is coupled directly to the output shaft 26 of the motor 23 (see FIGS. 1 and 5), while the wheel 25 is fixed to a supplemental shaft 27 equipped with a spur gear 28 which engages the spur gear 29 mounted on the shaft 26. The spur gear 28 is larger than the spur gear 29, so that the wheel 25 rotates more slowly than the wheel 24.

For the purpose of supporting the tapping attachment on the frame 10, the column 11 is extended upwardly as at 11a (see FIG. 1), and a column cap 30 is secured over the column 11 by setscrews as at 31. The cap 30 is suitably apertured as at 32 and receives a mounting post 33, the post 33 being suitably tapped as at 34 for the receipt of a bolt 35. The post 33 is vertically positionable within the cap 30 by means of a setscrew 36. Clamped against the upper end of the post 33 is a bracket generally designated 37 and which can be seen in larger scale in FIGS. 3 and 4.

The bracket 37 can be raised or lowered relative to the column 11 by loosening the setscrew 36 and thus positioning the post 33. Additionally, the bracket 37 may be shifted horizontally by loosening the bolt 35 to position the same in a different position within the elongated slot 38 provided in the bracket 37. As shown, the belt 18 is entrained in the groove 19a, so that the spindle is adapted to be driven at its fastest drilling speed.

From the foregoing, it will be appreciated that the bracket 37 is normally fixed in position, so to get pivotal movement of the wheels 24 and 25, a pivotal mounting in the form of the block generally designated 39 is provided. Referring specifically to FIGS. 3 and 4, it will be seen that the block is supported on an upper surface 37a of the bracket 37 and is equipped with a vertical bore as at 40 for the receipt of a pivot post 41. The pivot post 41 may be conveniently fixed in an aligned bore 42 provided in the left-hand portion of the bracket 37 as seen in FIGS. 3 and 4. The block 39 is equipped with a laterally-extending handle 42 (see also FIG. 1) which permits convenient pivoting of the block 39 on the post 41. The block 39 is equipped with upstanding walls as at 43 defining a chamber for the receipt of gears 28 and 29. The gear chamber 44 (see FIGS. 3 and 5) defined by the block 39 and, more particularly, the upstanding walls 44, is closed by a suitable cover 45. For this purpose, the corners of the block 39 are tapped as at 46 for the receipt of suitable bolts (not shown). Both the cover 45 and the lower wall 47 are suitably apertured for the receipt of bearings 48 in which shafts 26 and 27 are journaled. As mentioned previously, the shaft 26 is connected to the tapping motor 23, and thus the block 39 serves as a thrust bearing mount for the motor 23.

*Operation*

In operation, and after a hole has been suitably drilled in a workpiece (not shown), the drill motor 21 is turned off and the tapping motor 23 is energized by means of the finger switch 49 (seen only in FIG. 2) provided on the end of the laterally-extending handle 42. At this time, the motor is driving both wheels 24 and 25, but the same are in neutral positions designated 24a and 25a in FIG. 4. In this condition, both friction wheels 24 and 25 are out of contact with the pulley groove 19a and are maintained in that position by virtue of coil springs 50. The coil springs 50 are interposed between lugs 51 provided on the bracket 37 and an end wall 52 on the block 39 (see especially FIG. 3).

With a tap suitably attached to the spindle 15, the handle 42 is moved in the direction designated E in FIG. 2 to engage the friction wheel 25 with the pulley groove 19a (this condition being depicted in dotted line in FIG. 6). In this condition, the tap is located for entry into the drilled hole, and after the tapping has been completed, the handle 42 is moved in the opposite direction (designated R in FIG. 2) to rotate the tap in the direction for removal, the vertical movement of the tap being achieved through the operation of the hand wheel 16 in conventional fashion.

Where conventional pulleys are employed on the drill press (which usually accommodate V-belts), I prefer to taper the friction wheels 24 and 25, as can be best appreciated from a consideration of FIG. 5. The outer cylindrical wall of the wheels 24 and 25 may be equipped with suitable friction material, i.e., leather, rubber, etc., to facilitate the frictional engagement of either wheel with the pulley 19. It should be noted, however, that both wheels cannot engage the pulley at the same time. When the attachment is in the neutral position (see FIG. 4), these two friction wheels are close to engagement with the drill press pulley 19, but do not quite touch it. Consequently, a slight movement in either direction of the control lever 42 will swing one or the other of the friction wheels into engagement with the pulley. A light "finger tip" pressure on the control lever is sufficient to drive most small taps into the work. This also provides an effective clutch which helps prevent breakage of taps due to too much power applied to them. The rotation of the taps can be reversed instantly because the motor 23 continues to turn in the same direction, consequently there is no waiting for a motor to coast to a stop. This feature is of particular importance when tapping blind holes close to the bottom.

As shown, most conventional drill presses have step pulleys between the drill motor 21 and the spindle 15. These pulleys generally have four steps which provide four different speeds for the spindle. A low speed is generally used for large holes in steel, and a high speed is used for small holes in brass and aluminum. In most cases, the inventive attachment can operate with the same belt setting on the drill press as used for drilling the hole which is to be tapped. In other words, if a large hole has just been drilled in steel, the setting would normally be in the low speed range on the spindle, and this also could be used for tapping because such a setting multiplies the power of the tap and delivers more torque to the tap.

Another use to which the inventive attachment lends itself is that of providing an extra low speed on the spindle 15 for countersinking holes that have just been drilled. Most countersinks tend to chatter when chamfering the corner of the hole unless they are turned at an extremely low speed, and very few drill presses have such low speeds available. The attachment, by its very nature, is designed to turn the spindle at a low speed for tapping, and these low speeds are also well adapted for countersinking. At the same time, a high torque is delivered to the spindle, which makes it possible to use oversized drills when occasion demands which are normally beyond the capacity of the drill press.

For example, an ordinary drill press of ½" capacity cannot be used to drill a one inch hole in steel with its conventional motor drive. However, with the inventive attachment on this same drill press, it easily drills holes up to one inch in steel because of the low r.p.m. and high torque the attachment delivers to the spindle. The same low speed makes it possible to use tubular saws and fly cutters in a small drill press for cutting large circles out of sheetmetal—by "large," I refer to diameters up to 3" or so.

Another feature of the invention is that it can be used as a quick-acting brake to stop the spindle quickly after drilling a hole. It is nearly always desirable to stop the spindle after drilling one hole and before starting another in order to locate the work in proper position under the drill. If one waits for the spindle to coast to a stop, considerable time is wasted, and if the operator tries to stop it by hand, he is liable to tear his skin. I find that the capacity of the inventive attachment corresponds roughly to the capacity of the drill press. For example, a drill press which has a ½" diameter drill capacity can be used for tapping a ½–20 pitch thread in mild steel. A tap of this size in steel requires a low speed on the drill press to deliver maximum power to the spindle.

While, in the foregoing specification, a detailed description of an embodiment of the invention has been set down for the purpose of explanation thereof, many variations in the details herein given may be made by those skilled in the art without departing from the spirit and scope of the invention.

I claim:

1. In a drill press adapted for tapping:
   a frame equipped with a reciprocable spindle and a drill motor,
   a pulley on each of said spindle and motor and a belt for interconnecting said pulleys for powering said spindle,
   a tap motor pivotally mounted on said frame,
   a pair of wheels connected to said motor and adapted to rotate in opposite directions, and
   means on said frame for selectively engaging one of said wheels with said drill motor pulley.

2. The structure of claim 1 in which a pair of gears are interposed between said motor and wheels, said gears being of different diameters to drive said wheels at different speeds, whereby a tap affixed to said spindle is adapted to be driven at different speeds during entry and removal.

3. A drill press attachment for providing tapped holes using the drill press spindle, comprising:
   a pivotal mounting adapted to be secured to the drill press frame,
   a tapping motor mounted on said mounting and equipped with an output shaft,
   a pair of engaged, different-sized spur gears rotatably mounted on said mounting, the smaller gear being fixed to said shaft, and
   a friction wheel coupled to each gear for rotation therewith for engaging the power train of the drill press to drive the spindle independently of the drill press motor.

4. The structure of claim 3 in which said pivotal mounting includes a block equipped with a vertical bore, a mounting bracket including an upstanding post received in said bore, and spring means interposed between said block and bracket for urging said block to a predetermined position relative to said bracket.

5. The structure of claim 4 in which said block is equipped with a horizontally-extending handle, and switch means on said handle for controlling said tapping motor.

6. The structure of claim 4 in which said bracket is equipped with a horizontally-extending slot whereby said mounting is positionably related relative to said power train.

7. A drill press, comprising a frame equipped with a reciprocable spindle and a drill motor, a pulley on each of said spindle and motor and a belt interconnecting said pulleys for powering said spindle, a tap motor pivotally mounted on said frame, a pair of wheels connected to said tap motor and adapted to rotate in opposite directions, gear means interposed between said tap motor and the first of said wheels for driving said first wheel slower than the other, and means on said frame for selectively engaging one of said wheels with said drill motor pulley.

8. The structure of claim 7 in which said tap motor is equipped with block means providing the pivotal mounting on said frame, and spring means operably associated with said block means for positioning both of said wheels out of engagement with said drill motor pulley.

9. The structure of claim 7 in which said drill motor pulley includes a movable grooved pulley of graduated groove diameter, the largest diameter groove being positioned uppermost, said tap motor being mounted on said frame to position said wheels for engagement with said uppermost groove.

10. A drill press, comprising a frame equipped with a vertically reciprocable spindle, a drill motor and a power train connecting said motor and spindle for rotating the spindle in a drilling operation, a tapping drive mounting pivotally mounted on said frame, a tapping motor on said mounting, and means coupled to said tapping motor and selectively engageable with said power train for rotating said spindle independently of the drilling motor, said mounting including an apertured block, a post pivotally received in said aperture and supported on said frame, said block rotatably supporting first and second vertically-extending shafts, each shaft having a gear above said block and a further wheel below said block, said gears being in engagement and said motor being connected to one of said shafts whereby said wheels rotate in different directions for selectively engaging said power train.

11. The structure of claim 10 in which said frame is equipped with a pair of springs, one on each side of said post and in engagement with said block to urge said block to a neutral position wherein both wheels are out of engagement with said power train.

References Cited in the file of this patent
UNITED STATES PATENTS

| | | |
|---|---|---|
| 541,029 | Woodworth | June 11, 1895 |
| 2,564,160 | Jones | Aug. 14, 1951 |
| 2,813,280 | Huffman | Nov. 19, 1957 |

FOREIGN PATENTS

| | | |
|---|---|---|
| 108,184 | Sweden | Aug. 10, 1943 |